United States Patent
Harris et al.

(10) Patent No.: US 7,215,098 B2
(45) Date of Patent: May 8, 2007

(54) ELECTRICAL GENERATING SYSTEM HAVING CAPACITATIVE CONTROL OF ALTERNATOR REGULATION

(75) Inventors: Martyn Harris, Otterbourne (GB); Matthew James Reed, Bassett (GB)

(73) Assignee: Bowman Power Systems Ltd., Southampton (GB)

( * ) Notice: Subject to any disclaimer, the term of this patent is extended or adjusted under 35 U.S.C. 154(b) by 106 days.

(21) Appl. No.: 10/248,943

(22) Filed: Mar. 4, 2003

(65) Prior Publication Data
US 2003/0222459 A1    Dec. 4, 2003

(30) Foreign Application Priority Data
May 31, 2002    (GB)    ................. 0212765.2

(51) Int. Cl.
*H02H 7/06*    (2006.01)
*H02P 9/00*    (2006.01)
*H02P 11/00*    (2006.01)
*H02P 9/46*    (2006.01)

(52) U.S. Cl. .................................. 322/24; 322/47
(58) Field of Classification Search ................ 322/24, 322/47
See application file for complete search history.

(56) References Cited

U.S. PATENT DOCUMENTS

| 3,626,273 | A | * | 12/1971 | Pfeffer et al. | 322/28 |
| 3,657,607 | A | * | 4/1972 | Knauer | 361/9 |
| 3,743,914 | A | * | 7/1973 | Holz | 363/62 |
| 3,781,606 | A | * | 12/1973 | Long et al. | 361/11 |
| 3,808,512 | A | * | 4/1974 | Sakka | 363/62 |
| 3,839,666 | A | * | 10/1974 | Kitaev | 363/138 |
| 3,889,106 | A | * | 6/1975 | Alliston et al. | 703/18 |
| 3,912,975 | A | * | 10/1975 | Knauer et al. | 361/58 |
| 4,212,005 | A | * | 7/1980 | Hubert et al. | 340/603 |
| 4,322,623 | A | * | 3/1982 | Grady | 378/103 |
| 4,426,613 | A |   | 1/1984 | Mizuno et al. | 322/21 |
| 4,523,269 | A | * | 6/1985 | Baker et al. | 363/138 |
| 4,636,930 | A | * | 1/1987 | Bingham et al. | 363/60 |
| 4,649,468 | A | * | 3/1987 | Cubbison, Jr. | 363/62 |
| 4,663,536 | A | * | 5/1987 | Roesel et al. | 290/7 |
| 4,675,795 | A | * | 6/1987 | Takamura et al. | 363/61 |
| 4,797,899 | A | * | 1/1989 | Fuller et al. | 375/219 |

(Continued)

FOREIGN PATENT DOCUMENTS

EP    0901218    3/1999

(Continued)

*Primary Examiner*—Darren Schuberg
*Assistant Examiner*—Pedro J. Cuevas
(74) *Attorney, Agent, or Firm*—Price, Heneveld, Cooper, DeWitt & Litton (57) ABSTRACT

The invention provides an electrical generating system comprising an AC electrical generator (G) having an output, and a capacitor arrangement (Ca) provided at the output of the generator and arranged so as to offset a drop of voltage from no-load to full-load occurring at the output of the generator. As described, the generator (G) is a permanent-magnet generator having a plurality of terminals and associated output lines, and the capacitor arrangement comprises a respective capacitor (Ca) connected in series in each of the output lines, with the value of the capacitance of each capacitor being selected such that a drop of voltage from no-load to full-load occurring at the associated generator terminal is substantially offset at an output terminal of each said capacitor.

14 Claims, 5 Drawing Sheets

U.S. PATENT DOCUMENTS

| | | | |
|---|---|---|---|
| 4,807,104 A * | 2/1989 | Floyd et al. | 363/59 |
| 4,812,961 A * | 3/1989 | Essaff et al. | 363/61 |
| 4,816,985 A * | 3/1989 | Tanahashi | 363/81 |
| 4,947,308 A * | 8/1990 | Gulczynski | 363/16 |
| 4,956,760 A * | 9/1990 | Gulczynski | 363/16 |
| 4,977,529 A * | 12/1990 | Gregg et al. | 703/18 |
| 5,039,933 A * | 8/1991 | Dong | 322/47 |
| 5,105,096 A * | 4/1992 | Waldschmidt et al. | 307/68 |
| 5,177,677 A * | 1/1993 | Nakata et al. | 363/89 |
| 5,198,744 A | 3/1993 | Kohl et al. | 322/33 |
| 5,198,969 A * | 3/1993 | Redl et al. | 363/17 |
| 5,291,119 A * | 3/1994 | Cowett, Jr. | 323/207 |
| 5,381,081 A * | 1/1995 | Radun | 322/94 |
| 5,422,778 A * | 6/1995 | Good et al. | 361/92 |
| 5,525,894 A * | 6/1996 | Heller | 322/20 |
| 5,627,738 A | 5/1997 | Lubomirsky et al. | 363/49 |
| 5,747,972 A * | 5/1998 | Baretich et al. | 323/223 |
| 5,986,438 A * | 11/1999 | Wallace et al. | 322/20 |
| 6,118,678 A * | 9/2000 | Limpaecher et al. | 363/60 |
| 6,166,929 A | 12/2000 | Ma et al. | 363/37 |
| 6,456,477 B1 * | 9/2002 | McIntosh et al. | 361/115 |
| 6,815,934 B2 * | 11/2004 | Colley | 322/47 |
| 6,819,545 B1 * | 11/2004 | Lobo et al. | 361/534 |
| 6,992,466 B2 * | 1/2006 | Chadwick et al. | 322/37 |
| 7,035,124 B2 * | 4/2006 | Chadwick et al. | 363/40 |
| 2004/0075424 A1 * | 4/2004 | Chadwick et al. | 324/76.12 |
| 2004/0080966 A1 * | 4/2004 | Chadwick et al. | 363/132 |

FOREIGN PATENT DOCUMENTS

| | | |
|---|---|---|
| GB | 1350176 | 4/1974 |
| GB | 2193394 | 2/1988 |
| JP | 231167 | 8/2001 |
| WO | 9424622 | 10/1994 |

* cited by examiner

PRIOR ART

FIG. 6

ELECTRICAL GENERATING SYSTEM HAVING CAPACITATIVE CONTROL OF ALTERNATOR REGULATION

SUMMARY OF INVENTION

The invention relates to an electrical generating system which comprises a high frequency generator as one component of the system in the main power chain, and is particularly concerned with improvements to the output of such a high-frequency generator. In a preferred embodiment, the generator is a rotating permanent-magnet generator.

The principle of the invention is applicable to any such system, but in practice the invention is most valuable for systems in which the generator either rotates at high speed or has many poles, or a combination of the two, so as to produce electrical power at the generator terminals at a relatively high frequency. The best frequency is found to be a function of the rated power output of the generator. With present technology and as a very rough guideline, it may be said that substantial practical and economic benefit may be demonstrated for the invention if the product of frequency in kilohertz and rated machine power in kilowatts is of the order of a few hundred, or anywhere in a band from 100 to 1000 and perhaps higher. However, this guideline should not be taken to define limits outside which the invention is not applicable with advantage.

A particularly important example of such a generating system is known as a micro-turbine-generator, or MTG, which is designed to provide moderate amounts of power from around a few kW to a few MW. Examples of MTG applications are: to provide power to specific local loads, or to a multiplicity of points in a distribution network supplying a large number of local loads dispersed over a region, or to a parallel combination of local loads and a distribution network.

Figure 1:
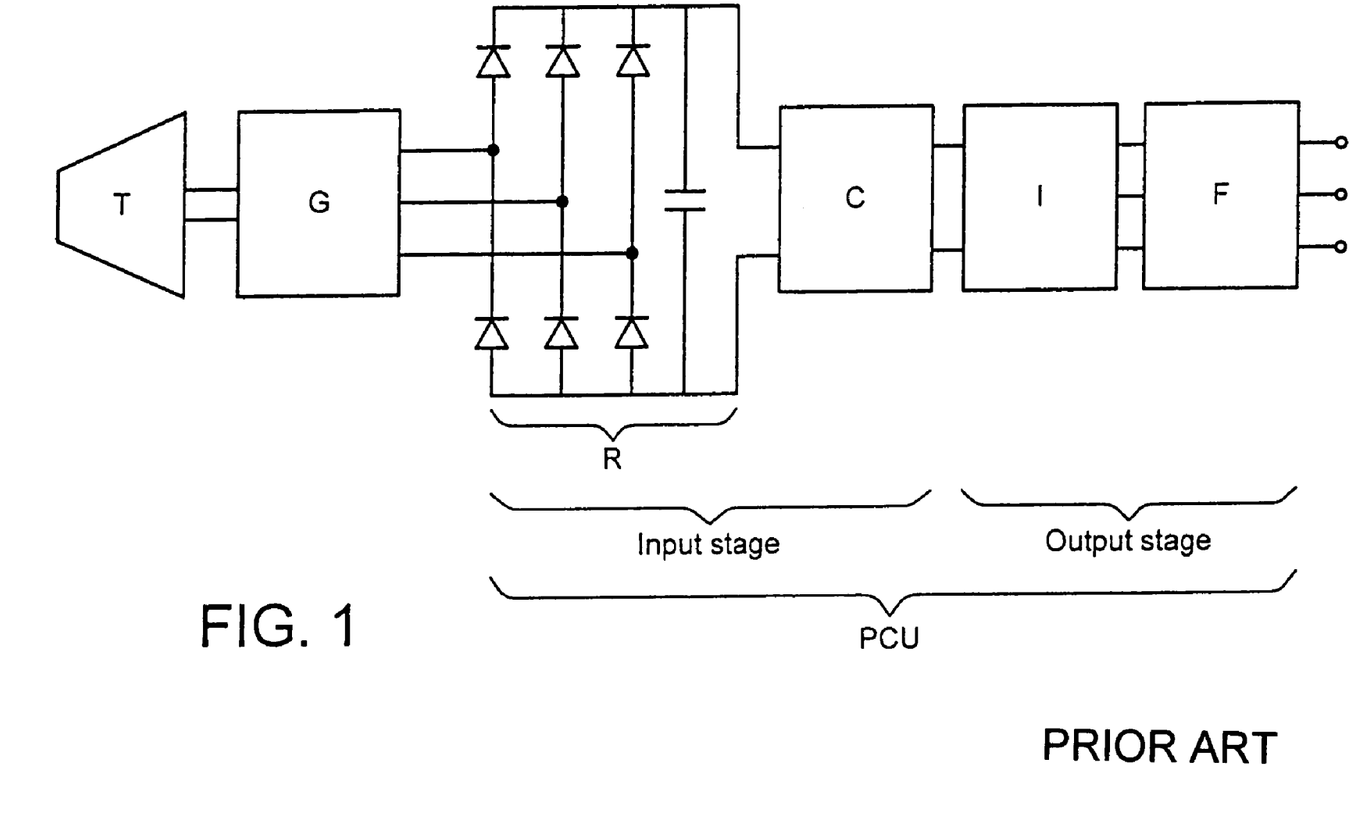
Figure 2:
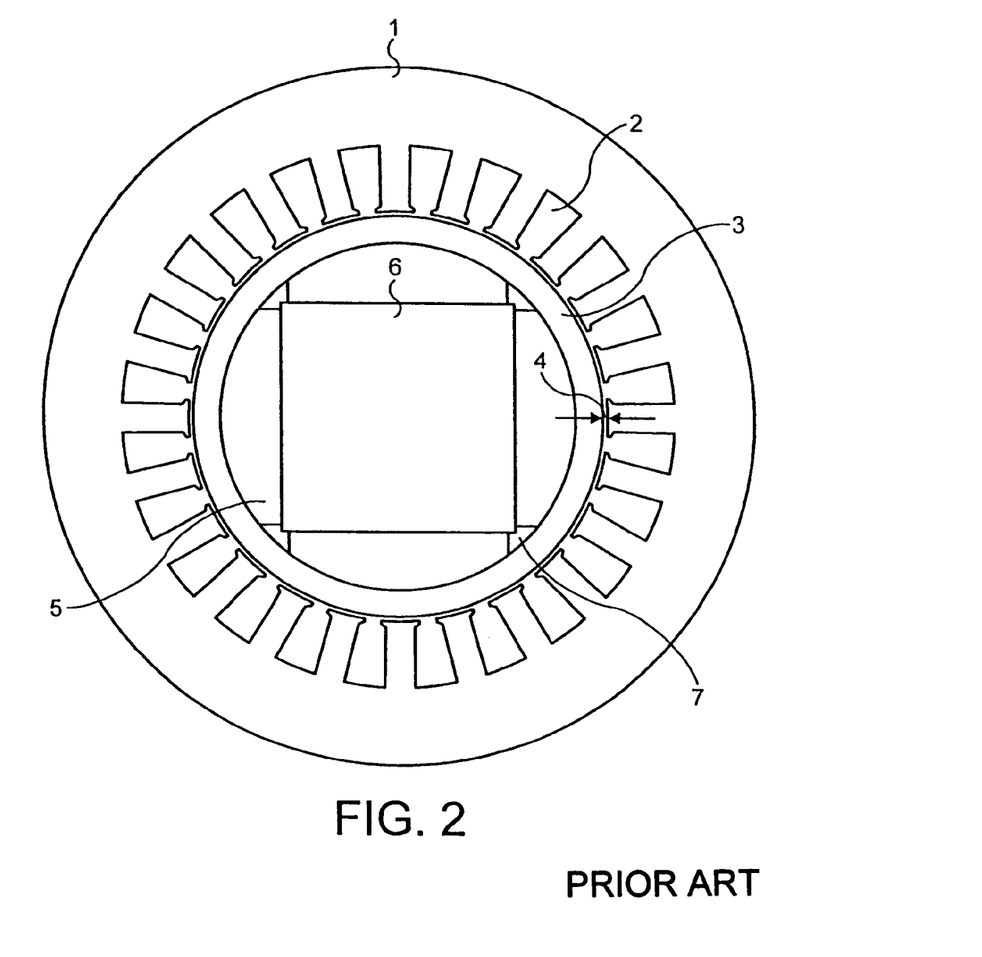
Figure 3:
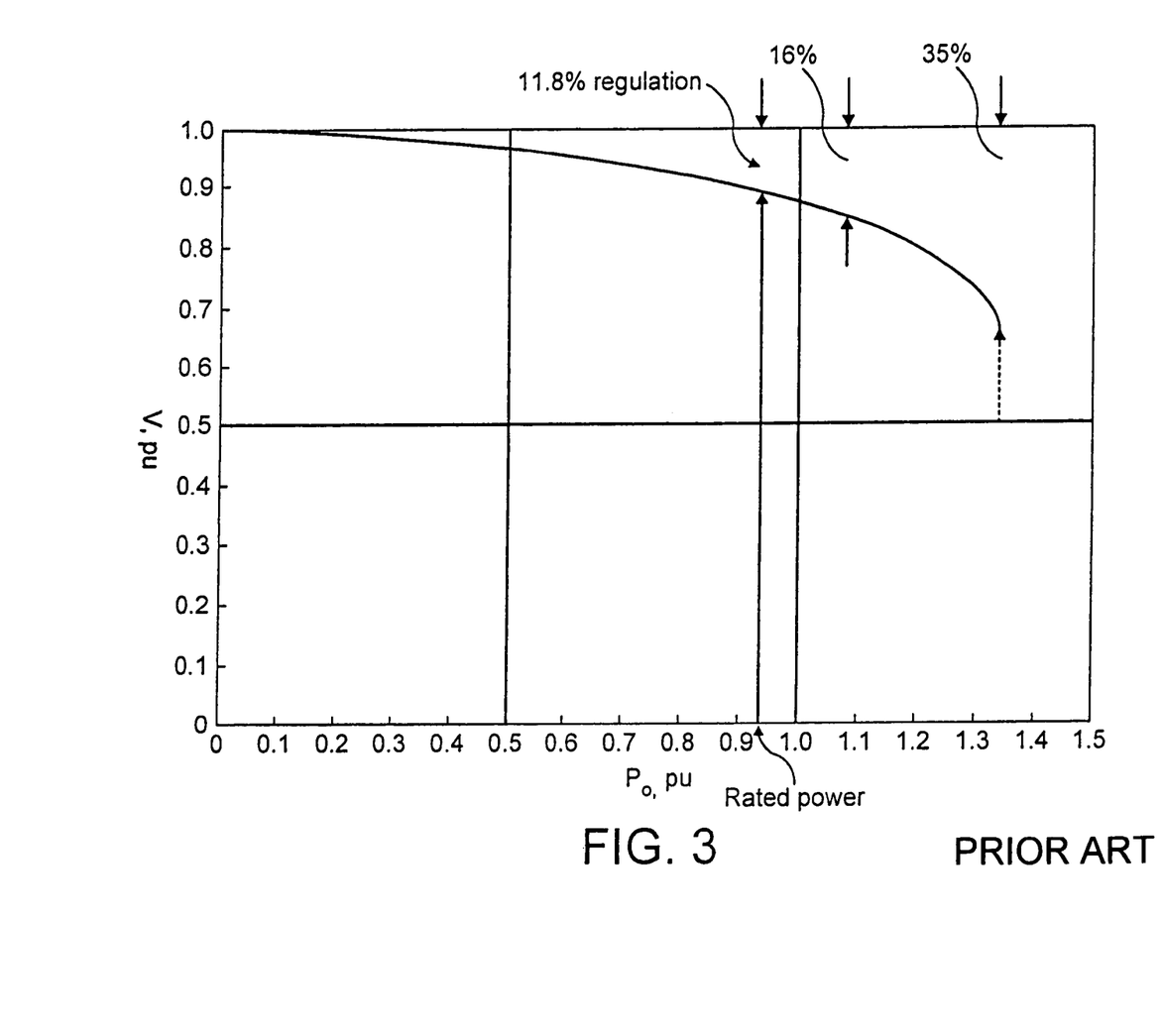

A conventional MTG system is shown and described with reference to FIGS. 1 to 3 of the accompanying drawings, in which: FIG. 1 is a circuit diagram of a typical MTG system; FIG. 2 is a cross-sectional view of a four-pole permanent-magnet generator employed in the system of FIG. 1; and FIG. 3 is a graph of generator terminal voltage versus output power for the system of FIG. 1.

FIG. 1 shows an example of a typical MTG system that comprises a prime mover in the form of a gas turbine (T), mechanically coupled to a permanent-magnet poly-phase electrical generator (G). Electrically connected to the generator is a power conditioning unit (PCU) for converting the output voltages at the terminals of the generator to the voltage waveforms required by the consumer of the generated electricity at the output of the MTG.

The power conditioning unit (PCU) may typically comprise an input stage that may be an uncontrolled rectifier stage (R) as shown in FIG. 1, in which the rectifying elements are simple diodes, followed by a DC/DC converter (C), that takes the alternator voltages as input and produces a stable DC link voltage as output. Alternatively, the input stage may embody controllable switched devices such as IGBTs in place of the diodes, and the full function may be accomplished in one step by control of the switch timing of the devices. Connected to this input stage is the output stage of the power conditioning unit which may typically be a pulse width modulated (PWM) inverter (I) plus output filter (F). The output stage takes the DC link voltage as input and produces at its output sinusoidal three-phase voltages usually of 50 or 60 Hz. FIG. 1 shows a typical configuration based on the former option for the final stage; the invention is equally applicable to either option.

It is found in the design process for any permanent-magnet generator that the machine possesses substantial internal inductive reactance, which will be denoted Xint, that affects the performance at the terminals in an important way. (Depending on the geometry of the magnets and the underlying steel rotor hub, there may, as is well known, be some difference in the values of the per-phase two-axis reactances of the machine, commonly denoted by the d-axis and q-axis values Xd and Xq respectively, this effect being known as saliency. Since saliency is typically slight in the type of machine that forms the main focus of discussion, and since Xd has the greater influence on the relevant operating circumstances, that is accordingly the value implied herein when speaking of "the reactance" of the machine.) A rotating drum-type machine, having radial magnetic flux across an annular airgap with a heteropolar permanent-magnet rotor may be taken for illustration, as shown in FIG. 2, described in detail later. This is a widely adopted configuration because of various advantages: simplicity and robustness of construction; high electrical efficiency; good achievement in terms of capability of high speed when designed with a prestressed retaining sleeve around the outer diameter of the rotor; and competitive manufacturing cost. When the design has been optimised in terms of the dimensions of the sleeve for the speed requirement, together with the proportions of the magnetic circuit to give the highest possible flux density at the airgap of the machine, and therefore the greatest possible voltage and power output at the terminals, it is common to find that the resultant steady state internal inductive reactance, when expressed in terms of the well-known per unit system (in which rated full-load voltage and current form the two bases or units for those variables, their quotient forms the base of impedance, and their product multiplied by the number of phases forms the base of power) is roughly the order of 0.4 pu.

A generator that possesses approximately such a level of reactance has a degree of reduction of terminal voltage from no-load to full load, termed voltage regulation, which can be accepted, though it is a disadvantage to the performance of the machine. FIG. 3 shows the characteristic of terminal voltage V versus output power Po, in per-unit terms, for a machine with internal per-unit reactance of 0.39 pu. The regulation at rated power may be readily determined from the usual phasor diagram (as exemplified later) for steady-state operation, and is found to be just under 12% as shown. (As shown in FIG. 3, this result includes a small percentage effect on output rms voltage due to harmonic voltages caused by a rectifier bridge that is assumed to be connected at the terminals). It should be noted that, as is well-known, rated power in the per-unit system has numerical value equal to the power factor, which in this example is 0.933. However, as can be seen from the Figure, if the power output is increased by 15% to 1.07 pu, the voltage regulation increases quite rapidly from just under 12% to about 16%. Worse still, at about 43% increase in power output above rated value (1.34 pu) the regulation is very high at about 35%, and this condition actually represents the operating limit of the machine; at that point the voltage is about to fall away to zero and no higher power level can be obtained. Any operating condition that approaches close to this limit is only marginally stable and highly undesirable.

In practical terms, allowing for variability in material properties of permanent magnets, machining tolerances on critical dimensions of the magnetic circuit, and the general desirability of having not too much voltage regulation from no-load to full-load together with reasonable stability of the voltage/power working point, it is fair to say that it is desirable to limit the internal inductive reactance to something less than 0.4 pu, and at the most about 0.45 pu, with correspondingly full-load regulation preferably not exceeding 12% and at most 14%.

The problem of internal reactance can, and generally does, place a constraint on the available power from a permanent-magnet generator, and this is for two distinct reasons. To exemplify the first constraint, suppose that a generator is designed to operate with a stipulated output power, and is found to have internal reactance of 0.45 pu. At that level of reactance the voltage regulation is around 14%, which means that the full-load output voltage is only 86% of what it was at no-load. If that drop of voltage could be avoided, so that the voltage remained approximately constant from no-load to full-load, then with the same current in the windings, the voltage-current product (which is the main determinant of power output assuming, as is typically the case, that power factor remains close to unity) would increase by ×1/0.86 or about 16%. The ohmic losses inside the machine remain the same (because current magnitude is unchanged), as do other principal components of loss, and so internal temperatures remain the same. Moreover, these losses represent a smaller fraction of the increased output power, and so machine efficiency has risen. Thus, internal reactance and consequent voltage regulation are seen to have the effect of reducing both available output power and efficiency of operation.

To exemplify the second constraint, it must first be appreciated that as rated current is increased in value, the effect is to increase the per-unit value of the internal reactance Xint, because the base of impedance has decreased due to the increase in the base of current, and therefore there is a corresponding increase in the percentage voltage regulation. In the design of a permanent-magnet generator, it may consequently turn out that the rated current has to be chosen, not to correspond to the highest permissible value that would raise internal temperatures to their highest safe levels, but rather to some lower value of current that limits the per-unit value of Xint to an acceptable level as discussed previously in relation to FIG. 3. This situation is quite commonly found to occur in the design of high speed electrical generators, particularly in the larger power sizes (say, 100 kW and up) where, due to dimensional scale effects, the proportionate heating effect of stator current in the windings tends to be less, and therefore the winding tends to run cool relative to the temperature limits set by insulation properties. Alternatively, it may be the case that the degree of internal cooling has been adjusted in design so as to allow temperatures to rise to their highest safe levels, by economising to some extent on cooling effort, but that cooling could be increased if there were the possibility of increasing the power output by so doing. In either case, it is the need to limit the effects of inductive reactance that is effectively imposing the limit on the current rating of the machine, and therefore on the rated power output, rather than the need to limit internal heating.

Thus, in general, inductive reactance may restrict the available output power from a permanent-magnet generator by two effects: firstly, by reducing the rated terminal voltage at rated current, which reduces both power output and efficiency; and secondly, by imposing a limit on the permissible current, this limit having to be accepted in order to restrict the per-unit value of the reactance to a suitable level. The first effect is always present in any machine that embodies significant internal inductive reactance. The second effect comes into play in any design in which rated current is determined not primarily by the need to limit internal heating, but rather by the need to hold the effects of reactive voltage drop down to an acceptable level. Both effects are however caused by inductive reactance being undesirably high.

The present invention concerns means for reducing or eliminating the effects of internal inductive reactance, thereby substantially increasing the permissible output power of the machine and its operating efficiency.

In accordance with the present invention, there is provided an electrical generating system comprising an AC electrical generator having an output, the system being characterised by a capacitor arrangement which is provided at the output of the generator and which is arranged so as to offset a drop of voltage from no-load to full-load occurring at the output of the generator, whereby to permit increased power to be drawn from the generator without an unacceptable drop in output voltage and without exceeding permissible temperature limits for the generator winding.

According to a preferred embodiment of the present invention, the generator is a poly-phase generator and there is provided in each output line of the generator a series capacitor, whose magnitude of capacitive reactance is so chosen as to have a substantial offsetting effect against the internal inductive reactance of the machine. Suppose that the machine has total internal effective inductive reactance per line equal to Xint. (If the machine is star-connected, then Xint equals the per-phase value of internal reactance, Xphase; if delta-connected, then by the well-known equivalence of delta- and star-connected systems it is easily seen that Xint=Xphase/3.) The capacitance value per line may be so chosen as to have a reactance Xcap approximately equal in magnitude to Xint at rated speed. Alternatively, Xcap may be chosen to be less than but a substantial fraction of Xint at rated speed, or it may (with due caution to avoid generating excessive voltages) be chosen to be somewhat greater than Xint. Considerations influencing this choice are discussed later.

Assuming that the capacitance value has been so sized as to counter-balance substantially the internal inductive reactance at rated speed, then the net series reactance in the line, which is now (Xint−Xcap), is much smaller than the previous value, Xint. The machine/capacitor combination behaves as though it were a simple generator with small internal reactance. Thus, the voltage at the terminals of the combination remains substantially constant from no-load to full-load. Moreover, if the power output of the machine is increased above its previous rating, the voltage remains approximately constant. It will be clear that both the constraints on power, discussed previously, have been removed. There is negligible loss of power output capability due to terminal voltage falling with load, and current is not constrained by the need to limit inductive reactive voltage drop within the machine to an acceptable level. Power losses in the external capacitors are very small, and efficiency accordingly improves as the power output is increased.

The attractiveness of this technique owes much to the superior performance of modern metallised-film capacitors. These can be made quite cheaply, and can offer a uniquely good combination of the following properties: capacitance per unit volume; ripple current tolerance; voltage withstand; long life; acceptability of case temperature in the order of 70° C. Use of the capacitors typically does not compromise the life of the equipment, and their cost may be considerably less than the extra cost of alternatively building a larger alternator to offer the same increase of power without capacitors—thus the cost per kilowatt of generated power is reduced. Moreover, it is readily possible to have capacitors designed and manufactured in moderate numbers to match, within the constraints of present technology, any specific application in terms of capacitance value and current and voltage ratings, without incurring a large cost penalty.

In this regard, it may be noted that the voltage rating of the capacitor is determined by the current through it, I, and the highest value of IXint voltage drop that can consequently occur across it in service; it needs to be typically only a fraction of the rated phase voltage of the machine. It is the limits to the physical properties of the capacitors that can be manufactured with metallised film technology that give rise to the preferred relationship between electrical frequency and machine power rating, that was indicated earlier. Particularly significant here is the way in which these limits of manufacturing technology cause capacitor current rating to be effectively linked to capacitance value, and hence restrict the way in which the ohmic (non-pu) value of Xint is related to current at a particular frequency.

As a useful guideline, it typically turns out in many cases that the apparent power rating of the total capacitor bank used with the machine may be up to about half its real power rating.

Clearly, by setting the inductive and capacitive reactances approximately equal at rated speed, a resonance condition (where the two reactance values are precisely equal although, of course, opposite in sign) is being established near to rated speed, and it is natural to inquire whether this produces any over-voltage or over-current effects, as are commonly encountered with resonance phenomena in other applications, that might be troublesome. However, this is a series resonance (because in the preferred embodiment the inductive and capacitive reactances are connected in series) as opposed to a parallel resonance, and consideration shows that in this case no over-voltage effects occur at resonant frequency, nor is there any over-current since current is controlled by the demand load connected to the complete generating system. Moreover, higher harmonic currents that are drawn from the generator by non-linear loads, such as a rectifier bridge, are negligibly affected, since the impedance to these currents is dominated by the internal inductive reactance of the machine, the capacitive reactance being small at the higher frequency.

One feature that calls for consideration at the design stage is operation at reduced speed. A moderate degree of speed reduction at rated power generally does not pose any problem. However, as speed and frequency reduce, capacitive reactance increases, and it is necessary to check that the voltage drop across the capacitor is not exceeding its permissible value due to the current passing through it. In this regard, the MTG application is particularly well suited. It is common practice to start the MTG set using the generator in motor mode to accelerate the shaft up to a speed at which the turbine can become self-sustaining, which typically occurs at around 40% rated speed. As part of the switching operations to establish the motoring mode, it is convenient to switch the capacitors out of circuit, switching them back in when the mode changes over to generating. At the lower end of the speed range above this changeover point, the turbine has very restricted capability to generate power. Consequently, high line currents at low speed are not experienced. It is typically found with an MTG system that if the capacitor is rated for voltage in accordance with the highest IXcap voltage drop that occurs in any defined operating condition at or near rated speed, then no other condition occurs during start-up or other transient circumstance that calls for a higher rating.

The operating power factor of the machine/capacitor combination is the same as for the machine alone, being determined by the characteristics of the connected load. However, the phase relationship between voltage and current at the machine terminals is changed by the addition of capacitors, and the magnitude of machine voltage on load is generally increased as a result. Without capacitors, this phase relationship generally gives a power factor of around 0.93 or better; with the capacitors added, the power factor typically improves. Detailed study shows the voltage at the machine terminals in any likely operating condition typically to be less than the rated no-load voltage of the machine.

The inclusion of the capacitors reduces the total series impedance in the output lines of the generator to a very low level. Consequently, any short circuit at or near the terminals of the machine/capacitor combination will cause an extremely high current that burns out the windings very rapidly. To protect the machine against such an external short circuit, it may be preferable to provide fuses or switches in its output lines with appropriate $I^2 t$ characteristic, so that thermal capacity can limit internal temperature rise to a safe level.

It is often satisfactory to size the capacitance value so that capacitive reactance compensates most but not all of the inductive reactance, and voltage regulation at the output terminals is reduced to a few percent. By reducing the capacitance and so increasing reactance, an approximately level voltage characteristic can be obtained. In general, it is found to be perfectly permissible to reduce capacitance still further so that there is a moderate degree of rise of voltage at the generator/capacitor output terminals. This can be used to offset the fall of voltage with load that typically occurs across a following rectifier stage, so that the final output DC voltage is substantially constant, independent of load. It may thus be possible to avoid the cost and extra losses associated with a further DC/DC converter, which would otherwise typically be needed to maintain a controlled, constant DC voltage. However, in the MTG case for example, it is common to design for some variation of speed with load, so as to optimize the efficiency of the turbine on part load. In that case, the provision of a constant DC level for all operating conditions simply by suitably sizing the capacitance is not possible.

Preferred features of the generating system according to the present invention are set out in the following paragraphs.

According to these preferred features, a permanent-magnet AC electrical generator has capacitors connected in series in one or more of the output lines of the generator, the value of capacitance being so chosen that the drop of voltage from no-load to full-load that would occur at the terminals of the machine without the effect of the capacitors is substantially offset in respect of the voltage occurring at the output terminals of the capacitors, thus permitting increased power to be drawn from the machine/capacitor combination without unacceptable drop in output voltage and without exceeding permissible temperature limits for the machine winding.

The permanent-magnet AC electrical generator may be a poly-phase AC generator, with the capacitors connected in series in each of the poly-phase output lines.

Advantageously, the electrical generator operates at a fairly high frequency such that the combination of required capacitance value and required voltage rating and current rating of the capacitor forms a good match to what is naturally available with metallised film or other high-output capacitor technology, thus enabling the cost of the capacitors per kW of increased power output to be advantageously less than the saved cost per kW in the generator by virtue of its reduced size for the given power rating.

For example, the generator may be driven either directly or through gearing by the turbine in a micro-turbine-generator system.

In the preferred embodiment, the machine/capacitor combination is connected to a rectifier bridge and the capacitance value is so chosen that the DC output voltage from the rectifier bridge varies approximately in a required manner with variation of load. For example, the capacitance value may be so chosen that the DC output voltage from the rectifier bridge is substantially constant, independent of the load.

One possible advantage of the use of such capacitors is to enable a smaller electrical machine for the given power rating to be fitted into a smaller void space than would be possible or convenient without the use of the capacitors.

The invention at least in its preferred form described below thus provides an arrangement for obtaining greater power from a permanent-magnet generator, with improved efficiency and in may cases lower cost per generated kilowatt, by connecting capacitors in series with the poly-phase output lines of the generator. The arrangement shows greatest benefit in, but is not in principle restricted to, generators that produce their output power at fairly high frequency, defined by the relationship f (in kilohertz) multiplied by rated power (in kilowatts) is close to or greater than 100.

Consequently, a particularly important application of the invention is to micro-turbine-generators, where power output can usually be increased by at least 15%, and quite often by up to 35% or even more. The value of capacitance must be appropriately chosen, so as substantially to offset the adverse effects of internal inductive reactance, and power output is consequently increased due to two distinct effects. Firstly, the voltage at the terminals of the machine/capacitor combination shows little or no voltage drop from no-load to full-load, differing from the action of the machine alone, where substantial voltage drop occurs. The power output of the combination is correspondingly greater for the same generator current magnitude. Secondly, it is no longer necessary to restrict the value of rated current in order to hold the aforesaid voltage drop at an acceptable level. If this restriction was previously causing the machine to be rated at a current magnitude less than that which could be tolerated on grounds of internal temperature rise alone, then it now becomes possible to up-rate the current and so further increase power output.

BRIEF DESCRIPTION OF DRAWINGS

The invention will now be described by way of example only and with reference to the accompanying drawings, in which:

FIGS. 1 to 3 show a conventional MTG system, as discussed above;

DETAILED DESCRIPTION

Referring firstly to FIG. 2, this shows a cross section of an electrical generator rated 84 kW output power at 80,000 r/min, for use in an MTG system as shown in FIG. 1. A stator lamination (1) is provided with 24 slots (2) into which is inserted a 3-phase, 4-pole winding (not shown). A prestressed cylindrical sleeve (3) which may be made of inconel or carbon fiber retains four rare-earth permanent-magnet rotor poles (5) which are bonded to an inner steel hub (6). Interstices under the sleeve between magnets contain epoxy filler (7). Between the stationary stator and the rotating sleeve there is a radial airgap (4). The stator is cooled by a close fitting water jacket (not shown) surrounding the OD laminations. Air cooling may be supplied axially along the airgap as necessary to control principally the operating temperature of the rotor.

Principal design details (all dimensions in mm) are as follows: outer diameter of stator lamination=105.0; diameter to slot bottoms=80.0; diameter at stator bore—60.6; diameter over sleeve=59.6; diameter over magnets=51.3; width of square hub=34.5; width of main part of tooth=4.2; slot opening=2.2; axial length (not shown) of laminated core and magnets=125.0.

Stator winding comprises: 24 coils in 2-layer form; the coils of one phase connected to form two parallel paths; each coil wound with 3 series turns; stator conductor=19 strands of 25 American Wire Gauge (AWG) enamelled wire. Insulation specification permits 180° C. maximum winding temperature. Coolant inlet temperature=50° C.

A person skilled in the art of electrical machine design may verify the following: the machine generates 298 rms V/phase on no-load; total inductance on the d-axis=57.8 µH/phase, giving reactance=0.968 ohms/phase at an electrical frequency=2.67 kHz; when delivering 84 kW output power into an uncontrolled 3-phase rectifier bridge the terminal voltage falls to 260 rms V/phase, current=117 rms A/line; per-unit impedance base=2.23 ohms; per-unit x-axis reactance=0.434 pu; voltage regulation=13.5%; efficiency= 97.8%; with 0.1 liter/sec of water flow and adequate supply of air to the airgap the maximum temperature in the winding=155° C.

This machine therefore represents an example towards the high-regulation end of the advisable range recommended earlier, having reactance of 0.434 pu (close to the advisable limit of 0.45 pu) and regulation correspondingly of 13.5% (close to the advisable limit of 14%). Clearly, with this machine, it would not be advisable (or indeed, possible) to increase the power rating significantly. Note, however, that the winding temperature is comfortably less than the maximum of 180° C. that is in fact permissible according to the insulation specification. This is a machine, therefore, that suffers from both the effects described earlier: the drop of voltage on full load substantially reduces the available power, and the current cannot be increased further to take advantage of the permissible maximum temperature because it will bring the operating point too close to the absolute power limit that is depicted (for a slightly lower value of per-unit reactance) by the curve of FIG. 3.

Figure 4:
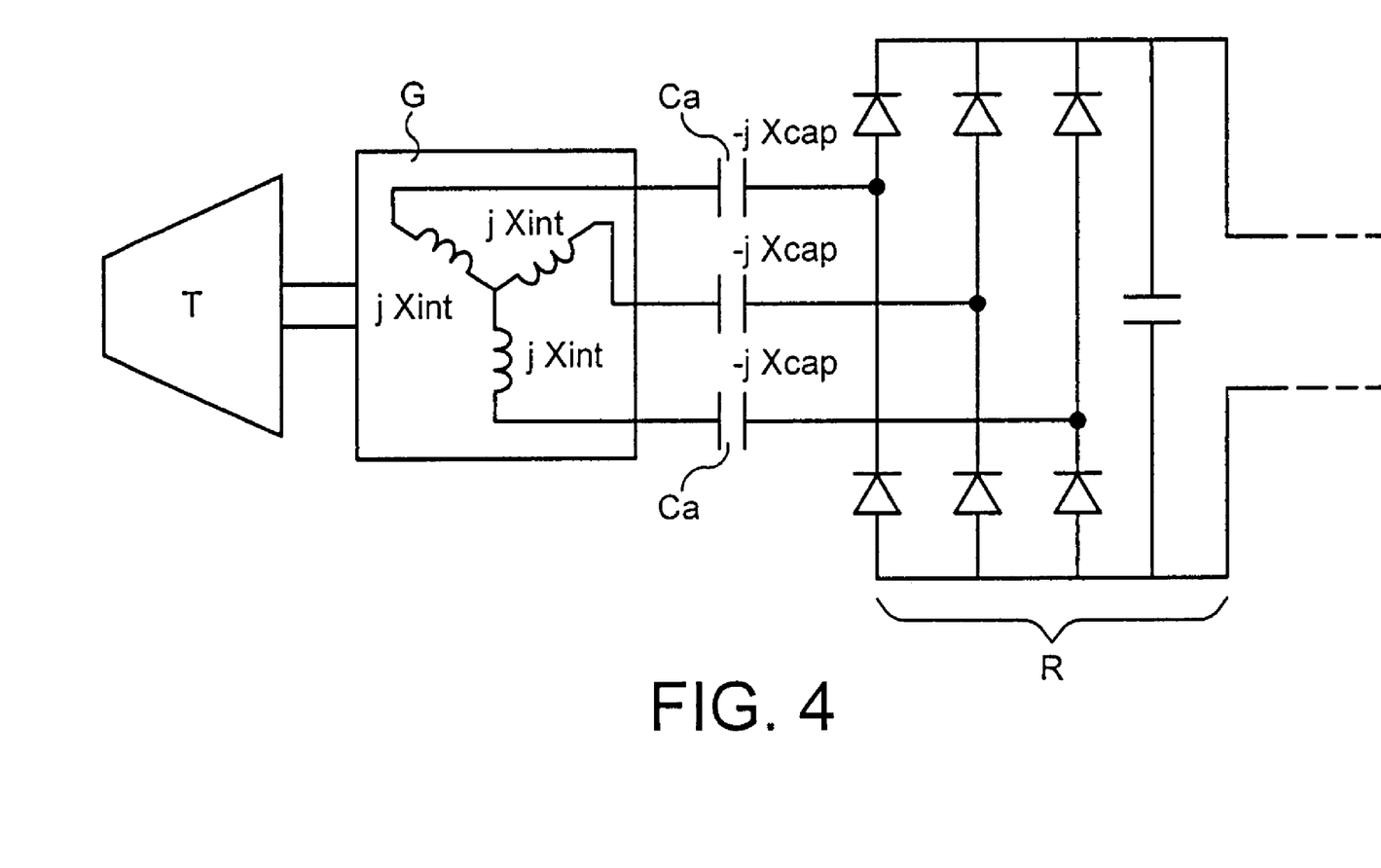
FIG. 4 is a circuit diagram showing a modification of the system of FIG. 1 in which the generator is formed as a star-connected generator with series connected capacitors.

In accordance with the invention, capacitors may now be introduced as shown in FIG. 4. The general arrangement shown in FIG. 4 depicts the generator (G) and rectifier stage (R) of FIG. 1, assuming for example a star connected generator, and shows series capacitors (Ca) added.

In the example of FIG. 4, capacitance value is 80 µF/line, rated 150 rms V max, ripple current=150 rms A max, permissible case temperature=70° C., 100,000 hour life minimum at fully rated condition, considerably more if running cooler. The choice is now made to increase the power output of the machine by 25% to 105 kW. Again, a person skilled in the art of electrical machine design may verify the following: no-load voltage and inductance in μH/phase unchanged; when delivering 105 kW output power into an uncontrolled 3-phase rectifier bridge the terminal voltage of the machine/capacitor combination falls to 294 V/phase; current=129 A/line; voltage regulation=1.4%; efficiency=97.9%; maximum temperature in the winding=173° C.

This arrangement is now producing 25% more power out of the same machine. Voltage regulation is almost negligible, efficiency has slightly improved, and winding temperature is still comfortably within specification. In other examples, it is possible to demonstrate an even greater percentage increase in output power, more marked improvement in efficiency, and generally lower temperature rises than are characteristic of this case.

Figure 5:
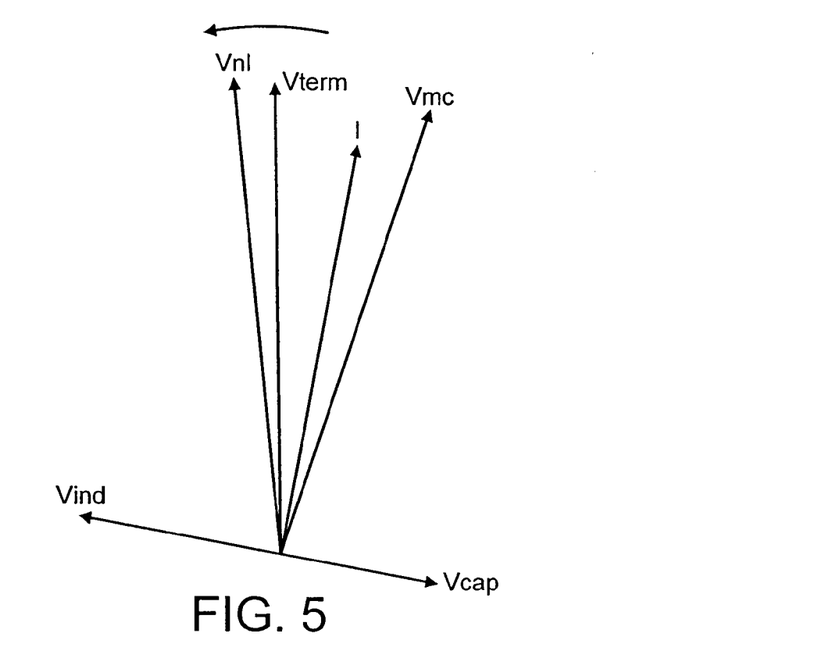
FIG. 5 is a phasor diagram for the generator of FIG. 4 including the series connected capacitors.

The phasor diagram in FIG. 5 depicts this operating condition, for the fundamental sinusoidal components of voltage and current. (Minor apparent discrepancies in quoted numbers and between numbers and diagram are due to second order effects introduced by voltage and current harmonics and saliency.) The quantities Vcap and Vind are the voltages dropped across the capacitor and across the internal machine inductance, respectively, Vterm is the output terminal voltage of the machine/capacitor combination, Vmc is the voltage at the terminals of the machine, and VnI is the particular value of Vmc on no-load. Phasor relationships are: Vind=j I Xint; V cap=−j I Xcap; Vterm=VnI−(Vind+Vcap); Vmc=VnI−j I Xint. It will be clear that the output voltage is similar in magnitude to the no-load voltage when the capacitors are present, showing almost negligible reduction (low voltage regulation). Also it can be seen that the voltage at the machine terminals is similar in magnitude to the no-load voltage, again showing a small reduction, and that the phase angle between Vmc and I is small, giving an internal power factor (equal to the cosine of this angle, neglecting minor harmonic effects in the current and voltage waveforms) that is close to unity.

Figure 6:
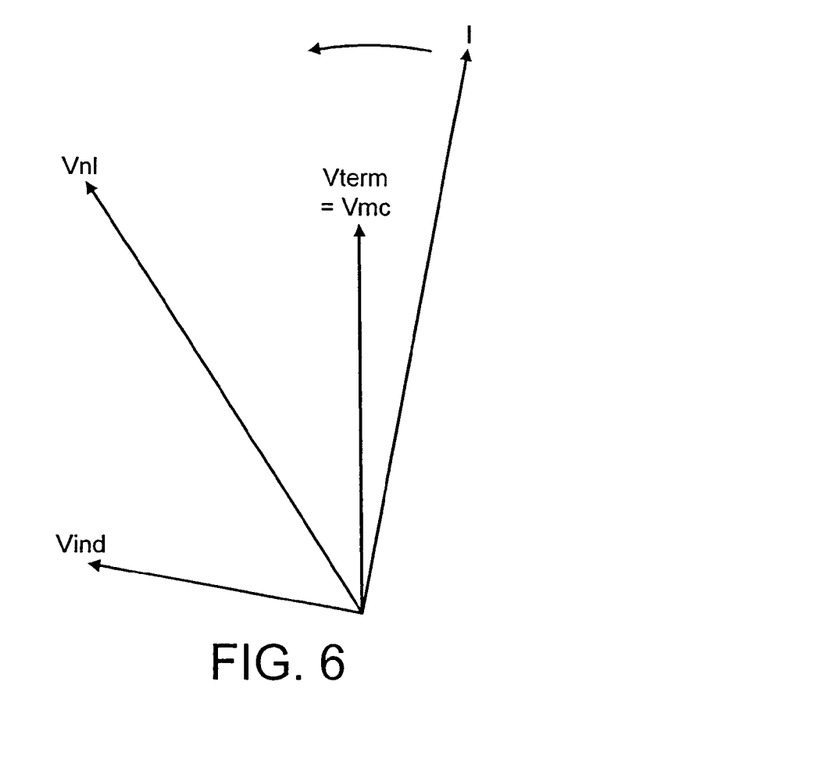
FIG. 6 is a phasor diagram for the generator of FIG. 1 without the series connected capacitors.

FIG. 6 shows the situation if the capacitors are removed and it is attempted to work still at 105 kW. Vmc (which now is the same as Vterm) is much reduced at 228 V (high regulation). The current I increases to the unacceptably high value of 166 A, which will rapidly over-heat the machine, and Vind is increased correspondingly. A further important point, not immediately apparent from inspecting the diagram, is that this operating condition is not undesirably close to the absolute limit of power output.

The following discussion makes clear why a value of frequency appropriately related to power rating is to be preferred. If the power, voltage and current data were as specified above, but related to a 4-pole machine running at only one tenth speed=8,000 r/min, for the sake of argument, then 10 times as much capacitance would clearly be required. This might be achieved by having 10 units in parallel of the same capacitor as before, which would cost 10 times as much and offer 10 times the current capability—which is not called for in this example. Current capability is being wasted, and the cost of capacitors per kW of power rating is therefore multiplied by 10, and that would probably exceed the saving in cost achieved by the reduced size of the machine for the given power. Alternatively, the increased capacitance might be achieved in a single larger unit, which would tend to be about 10 times the volume and again roughly 10 times the price, but because of connection difficulties would not offer so much increase in current rating. Considerations of this kind lead to the general conclusion that, for the greatest advantage, the frequency must be sufficiently high so that the combination of capacitance, voltage and current ratings, tend to match well to the natural optimum of what can be achieved by metallised film capacitor technology for the given ratings. In this regard, MTG units tend to be an example of a particularly good match, and the cost savings achieved by applying the invention in this embodiment are very substantial.

However, each case must be judged on its merits. The embodiment above is described by way of example and is only to be considered preferred and illustrative of the inventive concepts disclosed. The scope of the invention is not to be restricted to the embodiment. Various and numerous other arrangements may be devised by one skilled in the art without departing from the spirit and scope of this invention.

For example, the above description relates to an embodiment that includes a series connection for the capacitors, but an alternative possibility is to connect capacitors across the machine terminals in parallel with the external load. This can achieve improvement in voltage regulation and output power capability in a manner that is similar in principle to the action of series capacitors. However, there are features of the parallel connection that may be less desirable in a practical embodiment. In particular: a substantial increase occurs in the terminal voltage of the machine/capacitor combination at no-load (whereas series capacitance has no effect in this condition), and the machine may need to be re-designed in order to bring this voltage down to a desirable level; the effectiveness of the added capacitors tends to decrease with increase of load basically because the magnitude of the capacitor current that is being drawn through the machine is becoming smaller relative to the magnitude of the demanded load current (whereas the effectiveness of series capacitors is sustained well up to high load levels as has been discussed); it may typically be found that the combined voltage/current/frequency requirements for parallel capacitors do not match as well to what is available within the limits of manufacturing technology, compared with the requirements for series capacitors. However, with some system specifications, it may nonetheless be possible that the parallel configuration is to be preferred.

The invention claimed is:

1. A micro-turbine generating system comprising:
   a high frequency high-speed permanent-magnet poly-phase AC electrical generator having
   a plurality of generator terminals and having a plurality of poly-phase output lines associated with said generator terminals,
   a gas turbine coupled to said generator for driving said generator at high speeds, and
   a power conditioning unit connected to said output lines for receiving output voltages at said generator terminals for converting said output voltages into a voltage waveform for output to a load,
   wherein said generator has an internal inductive reactance producing in use a drop of voltage from no-load to full-load at said generator terminals, and
   wherein a capacitor arrangement is provided between said generator and said power conditioning unit to form a combined generator and capacitor arrangement having a plurality of output terminals for supplying output voltages to said power conditioning unit, said capacitor arrangement comprises a respective capacitor connected in series in each of said output lines, each said respective capacitor having a value of capacitance selected such that said drop of voltage from no-load to full-load is substantially offset at said output terminals of said combined generator and capacitor arrangement, thereby enabling the power range of operation of said generator to be extended.

2. A system according to claim 1, in which a product of frequency in kilohertz and rated machine power in kilowatts for said generator is approximately equal to or greater than 100.

3. A system according to claim 1, wherein said power conditioning unit comprises a rectifier bridge and wherein said capacitor arrangement is connected to said rectifier bridge so as to control a DC output voltage from said rectifier bridge to vary in a predetermined manner with variation of load.

4. A system according to claim 3, in which at least one of a capacitance value and a connection of each capacitor of said capacitor arrangement is selected so as to control said DC output voltage from said rectifier bridge to vary in a predetermined manner with variation of load.

5. A system according to claim 3, in which said DC output voltage from said rectifier bridge is arranged to be substantially constant independent of the load.

6. A system according to claim 1, in which said capacitor arrangement comprises at least one metallised film capacitor.

7. A system according to claim 1, further comprising means for switching said capacitor arrangement in and out of connection into the system.

8. A system according to claim 7, in which said switching means is arranged to be operative at a speed in a speed range from standstill to full speed respectively.

9. A system according to claim 1, further comprising a fuse arrangement provided at said output of said generator for limiting current flow in said terminals of said generator.

10. A system according to claim 1, in which said capacitor arrangement permits increased power to be drawn from said generator without an unacceptable drop in output voltage and without exceeding permissible temperature limits for the generator winding.

11. The system according to claim 1, wherein the power conditioning unit comprises an input stage and an output stage, the input stage comprising a rectifier bridge, wherein the value of capacitance of each said respective capacitor of the capacitor arrangement is selected so as to control a DC output voltage from the rectifier bridge to said output stage such that said DC output voltage is substantially constant independent of load, and further enabling the available DC voltage driving the output voltage from said power conditioning unit to be sustained at full value up to full-load power.

12. The system according to claim 1, wherein the generator comprises a permanent-magnet rotor and a stationary stator having a radial airgap therebetween.

13. A micro-turbine generating system comprising:
a high frequency high-speed permanent-magnet polyphase AC electrical generator having a plurality of generator terminals and having a plurality of polyphase output lines associated with said generator terminals,
a gas turbine coupled to said generator for driving said generator at high speeds, and
a power conditioning unit connected to said output lines for receiving output voltages at said generator terminals for converting said output voltages into a voltage waveform for output, said power conditioning unit having an input stage and an output stage, said input stage comprising a rectifier bridge,
wherein said generator has an internal inductive reactance producing in use a drop of voltage from no-load to full-load at said generator terminals, and
wherein a capacitor arrangement is provided between said generator and said input stage of said power conditioning unit to form a combined generator and capacitor arrangement having a plurality of output terminals for supplying output voltages to said input stage, said capacitor arrangement comprising a respective capacitor connected in series in each of said output lines, each said respective capacitor having a value of capacitance selected such that said drop of voltage from no-load to full-load is substantially offset at said output terminals of said combined generator and capacitor arrangement so as to control a DC output voltage from said rectifier bridge to said output stage such that said DC output voltage is substantially constant independent of load, thereby enabling the power range of operation of said generator to be extended and enabling the available DC voltage driving the output voltage from said power conditioning unit to be sustained at full value up to full-load power.

14. A micro-turbine generating system comprising:
a high frequency high-speed permanent-magnet polyphase AC electrical generator comprising a permanent-magnet rotor and a stationary stator having a radial airgap therebetween, said generator having a plurality of generator terminals and having a plurality of polyphase output lines associated with said generator terminals,
a gas turbine coupled to said generator for driving said generator at high speeds, and
a power conditioning unit connected to said output lines for receiving output voltages at said generator terminals for converting said output voltages into a voltage waveform for output,
wherein said generator has an internal inductive reactance producing in use a drop of voltage from no-load to full-load at said generator terminals, and
wherein a capacitor arrangement is provided between said generator and said power conditioning unit to form a combined generator and capacitor arrangement having a plurality of output terminals for supplying output voltages to said power conditioning unit, said capacitor arrangement comprising a respective capacitor connected in series in each of said output lines, each said respective capacitor having a value of capacitance selected such that said drop of voltage from no-load to full-load is substantially offset at said output terminals of said combined generator and capacitor arrangement, thereby enabling the power range of operation of said generator to be extended.

* * * * *

UNITED STATES PATENT AND TRADEMARK OFFICE
CERTIFICATE OF CORRECTION

PATENT NO.       : 7,215,098 B2
APPLICATION NO.  : 10/248943
DATED            : May 8, 2007
INVENTOR(S)      : Martyn Harris et al.

It is certified that error appears in the above-identified patent and that said Letters Patent is hereby corrected as shown below:

Column 9, lines 30-32;
"Vind=j I Xint; Vcap = -j I Xcap; Vterm = VnI - (Vind + Vcap); Vmc = VnI - J I Xint." should be --Vind=j I Xint; Vcap = -j I Xcap; Vterm = Vnl - (Vind + Vcap); Vmc = Vnl - J I Xint.--

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,215,098 B2  Page 1 of 1
APPLICATION NO. : 10/248943
DATED : May 8, 2007
INVENTOR(S) : Martyn Harris et al.

It is certified that error appears in the above-identified patent and that said Letters Patent is hereby corrected as shown below:

On The Title Page
Item "(73) Assignee: Bowman Power Systems Ltd." should be
--(73) Assignee: Bowman Power Group Ltd.--.

Signed and Sealed this

Nineteenth Day of February, 2008

JON W. DUDAS
*Director of the United States Patent and Trademark Office*